US012004074B2

(12) United States Patent
Khan

(10) Patent No.: US 12,004,074 B2
(45) Date of Patent: Jun. 4, 2024

(54) SMALL CELL WITH SELF-ORGANIZED NEIGHBOR-RELATIONSHIP TABLE

(71) Applicant: ARRIS Enterprises LLC, Suwanee, GA (US)

(72) Inventor: Awaiz Ahmad Khan, Milpitas, CA (US)

(73) Assignee: Ruckus IP Holdings LLC, Claremont, NC (US)

(*) Notice: Subject to any disclaimer, the term of this patent is extended or adjusted under 35 U.S.C. 154(b) by 717 days.

(21) Appl. No.: 17/198,632

(22) Filed: Mar. 11, 2021

(65) Prior Publication Data
US 2021/0297934 A1 Sep. 23, 2021

Related U.S. Application Data

(60) Provisional application No. 62/992,522, filed on Mar. 20, 2020.

(51) Int. Cl.
H04W 48/16 (2009.01)
H04B 17/318 (2015.01)
H04W 8/00 (2009.01)
H04W 24/10 (2009.01)
H04W 40/24 (2009.01)

(52) U.S. Cl.
CPC .......... *H04W 48/16* (2013.01); *H04B 17/318* (2015.01); *H04W 8/005* (2013.01); *H04W 24/10* (2013.01); *H04W 40/24* (2013.01)

(58) Field of Classification Search
CPC ..... H04W 48/16; H04W 8/005; H04W 40/24; H04W 24/10; H04B 17/318
USPC ........................................................ 370/338
See application file for complete search history.

(56) References Cited

U.S. PATENT DOCUMENTS

2008/0198798 A1* 8/2008 Wu ........................ H04W 16/02
370/328
2009/0264130 A1* 10/2009 Catovic ........... H04W 36/00835
455/436
2021/0211899 A1* 7/2021 Koziol ................. H04W 24/10

* cited by examiner

Primary Examiner — Chuck Huynh
(74) Attorney, Agent, or Firm — Steven Stupp

(57) ABSTRACT

During operation, a radio node may perform a network listen for wireless energy associated with a first subset of second radio nodes during a first time interval. Moreover, the radio node may monitor communication associated with a second subset of the second radio nodes during a second time interval and/or handovers between a third subset of the second radio nodes during a third time interval, where a given subset includes zero or more of the second radio nodes. Then, based at least in part on the first subset, the second subset and/or the third subset, the radio node may determine a change to a neighbor-relationship table, where the neighbor-relationship table includes information specifying the radio node and the second radio nodes. Next, the radio node may provide, to the second radio nodes or a computer, information specifying the change to the neighbor-relationship table.

21 Claims, 9 Drawing Sheets

SMALL CELL WITH SELF-ORGANIZED NEIGHBOR-RELATIONSHIP TABLE

CROSS REFERENCE TO RELATED APPLICATIONS

This application claims priority under 35 U.S.C. 119(e) to: U.S. Provisional Application Ser. No. 62/992,522, "Communication Using Arbitrary Selectable Polarization," filed on Mar. 20, 2020, by Awaiz Khan, et al., the contents of which are herein incorporated by reference.

FIELD

The described embodiments relate to techniques for communicating information among electronic devices. Notably, the described embodiments relate to techniques for collaboratively determining a neighbor-relationship table in a small cell.

BACKGROUND

While many electronic devices communicate with each other via large networks owned by a network operator, small-scale networks associated with entities are increasingly common. For example, a cellular-telephone network provided by a mobile network operator includes so-called 'macrocells' with base stations, while a small cell is a type of small-scale network provided by a different entity, such as a company or an organization. A small cell includes radio access nodes (which are sometimes referred to as 'radio nodes') that provide lower power than macrocells. Therefore, small cells provide smaller coverage areas than macrocells.

In principle, small cells complement the service offered by a cellular-telephone network and can offer improved communication performance, such as in a particular venue or environment. In practice, it can be difficult to manage resources in a small cell, which can impact the communication performance.

For example, in order to perform a handover of an electronic device from a source radio node to a target radio node in a small cell, the source radio node uses a neighbor-relationship table with information about the radio nodes in the small cell. However, in a dynamic communication environment, it can be difficult to maintain the neighbor-relationship tables used by the small cells. Inaccuracies in the neighbor-relationship table can degrade communication performance or disrupt service, and thus are frustrating to users.

SUMMARY

In a first group of embodiments, a radio node that dynamically updates a neighbor-relationship table is described. This radio node includes: a first node or connector; a first interface circuit, coupled to the first node or connector, that communicates with an electronic device using a wireless communication protocol; a second node or connector; and a second interface circuit, coupled to the second node or connector, that communicates with one or more second radio nodes using a wired communication protocol. During operation, the first interface circuit may perform a network listen for wireless energy associated with a first subset of the second radio nodes during a first time interval. Moreover, the second interface circuit may monitor communication associated with a second subset of the second radio nodes during a second time interval and/or handovers between a third subset of the second radio nodes during a third time interval, where a given subset includes zero or more of the second radio nodes. Then, based at least in part on the first subset of the second radio nodes, the second subset of the second radio nodes and/or the third subset of the second radio nodes, the radio node may determine a change to the neighbor-relationship table, where the neighbor-relationship table includes information specifying the radio node and the second radio nodes. Next, the second interface circuit provides, to the second radio nodes, information specifying the change to the neighbor-relationship table.

Note that the first interface circuit may be different from the second interface circuit. Moreover, one or more of the first time interval, the second time interval and the third time interval may be different. Alternatively, the first time interval, the second time interval and the third time interval may be the same, such as, e.g., 24 hrs.

Furthermore, the change to the neighbor-relationship table may include: adding a new second radio node to the neighbor-relationship table, where the new second radio node is not currently included in the neighbor-relationship table; and/or subtracting an existing second radio node from the neighbor-relationship table, where the existing second radio node is currently included in the neighbor-relationship table. For example, the existing second radio node may be subtracted when: no wireless energy associated with the existing second radio node is detected during the first time interval; no communication with the existing second radio node occurs during the second time interval, and/or a handover associated with the existing second radio node does not occur during the third time interval. Alternatively or additionally, the new second radio node may be added when: wireless energy associated with the new second radio node is detected during the first time interval; communication with the new second radio node occurs during the second time interval, and/or a handover associated with the new second radio node occurs during the third time interval.

Additionally, the communication associated with a second subset of the second radio nodes may use established connections between the radio node and the second subset of the second radio nodes.

In some embodiments, the wired communication protocol includes an X2 interface or an S1 interface.

Note that the wireless communication protocol may use a band of frequencies in a Citizens Broadband Radio Service (CBRS).

Moreover, the first interface circuit may provide, to the electronic device, information specifying one or more of the second radio nodes in the neighbor-relationship table, and may instruct the electronic device to scan for the one or more of the second radio nodes. In response, the first interface circuit may receive, from the electronic device, one or more communication-performance metrics associated with the one or more of the second radio nodes. For example, the one or more communication-performance metrics may include: a reference signal receive power (RSRP), a pathloss, etc. Then, the first interface circuit may provide, to the electronic device, an instruction for a handover to a target second radio node in the second radio nodes based at least in part on the one or more communication-performance metrics.

Furthermore, the radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), etc.

Additionally, using the second interface circuit, the radio node may receive, from at least one of the second radio nodes, additional information specifying an additional change to the neighbor-relationship table. Then, the radio node may update the neighbor-relationship table based at least in part on the additional change to the neighbor-relationship table.

Another embodiment provides a computer-readable storage medium with program instructions for use with the radio node. When executed by the radio node, the program instructions cause the radio node to perform at least some of the aforementioned operations in one or more of the preceding embodiments.

Another embodiment provides a method, which may be performed by the radio node. This method includes at least some of the aforementioned operations in one or more of the preceding embodiments.

In a second group of embodiments, a radio node that dynamically updates a neighbor-relationship table is described. This radio node includes: a node or connector; a first interface circuit that communicates with an electronic device using a wireless communication protocol; and a second interface circuit that communicates with a computer and one or more second radio nodes using a wired communication protocol. During operation, the first interface circuit may perform a network listen for wireless energy associated with a first subset of the second radio nodes during a first time interval. Moreover, the second interface circuit may monitor communication associated with a second subset of the second radio nodes during a second time interval and/or handovers between a third subset of the second radio nodes during a third time interval, where a given subset includes zero or more of the second radio nodes. Then, based at least in part on the first subset of the second radio nodes, the second subset of the second radio nodes and/or the third subset of the second radio nodes, the radio node may determine a change to the neighbor-relationship table, where the neighbor-relationship table includes information specifying the radio node and the second radio nodes. Next, the second interface circuit provides, to the computer, information specifying the change to the neighbor-relationship table.

Note that the first interface circuit may be different from the second interface circuit. Moreover, one or more of the first time interval, the second time interval and the third time interval may be different. Alternatively, the first time interval, the second time interval and the third time interval may be the same, such as, e.g., 24 hrs.

Furthermore, the change to the neighbor-relationship table may include: adding a new second radio node to the neighbor-relationship table, where the new second radio node is not currently included in the neighbor-relationship table; and/or subtracting an existing second radio node from the neighbor-relationship table, where the existing second radio node is currently included in the neighbor-relationship table. For example, the existing second radio node may be subtracted when: no wireless energy associated with the existing second radio node is detected during the first time interval; no communication with the existing second radio node occurs during the second time interval, and/or a handover associated with the existing second radio node does not occur during the third time interval. Alternatively or additionally, the new second radio node may be added when: wireless energy associated with the new second radio node is detected during the first time interval; communication with the new second radio node occurs during the second time interval, and/or a handover associated with the new second radio node occurs during the third time interval.

Additionally, the communication associated with a second subset of the second radio nodes may use established connections between the radio node and the second subset of the second radio nodes.

In some embodiments, the wired communication protocol includes an X2 interface or an S1 interface.

Note that the wireless communication protocol may use a band of frequencies in a Citizens Band Radio Service (CBRS).

Moreover, the first interface circuit may provide, to the electronic device, information specifying one or more of the second radio nodes in the neighbor-relationship table, and may instruct the electronic device to scan for the one or more of the second radio nodes. In response, the first interface circuit may receive, from the electronic device, one or more communication-performance metrics associated with the one or more of the second radio nodes. For example, the one or more communication-performance metrics may include: a reference signal receive power (RSRP), a pathloss, etc. Then, the first interface circuit may provide, to the electronic device, an instruction for a handover to a target second radio node in the second radio nodes based at least in part on the one or more communication-performance metrics.

Furthermore, the radio node may include: an eNodeB, a UMTS NodeB and RNC, an NR gNB or gNodeB.

Additionally, the radio node may receive, from the computer, an updated neighbor-relationship table.

Another embodiment provides the computer. This computer may maintain the neighbor-relationship table based at least in part on information received from the radio node and/or one or more of the second radio nodes, and may distribute the neighbor-relationship table to the radio node and the second radio nodes.

Another embodiment provides a computer-readable storage medium with program instructions for use with the radio node. When executed by the radio node, the program instructions cause the radio node to perform at least some of the aforementioned operations in one or more of the preceding embodiments.

Another embodiment provides a method, which may be performed by the radio node. This method includes at least some of the aforementioned operations in one or more of the preceding embodiments.

Another embodiment provides a computer-readable storage medium with program instructions for use with the radio node or the computer. When executed by the radio node or the computer, the program instructions cause the radio node or the computer to perform at least some of the aforementioned operations in one or more of the preceding embodiments.

Another embodiment provides a method, which may be performed by the radio node or the computer. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
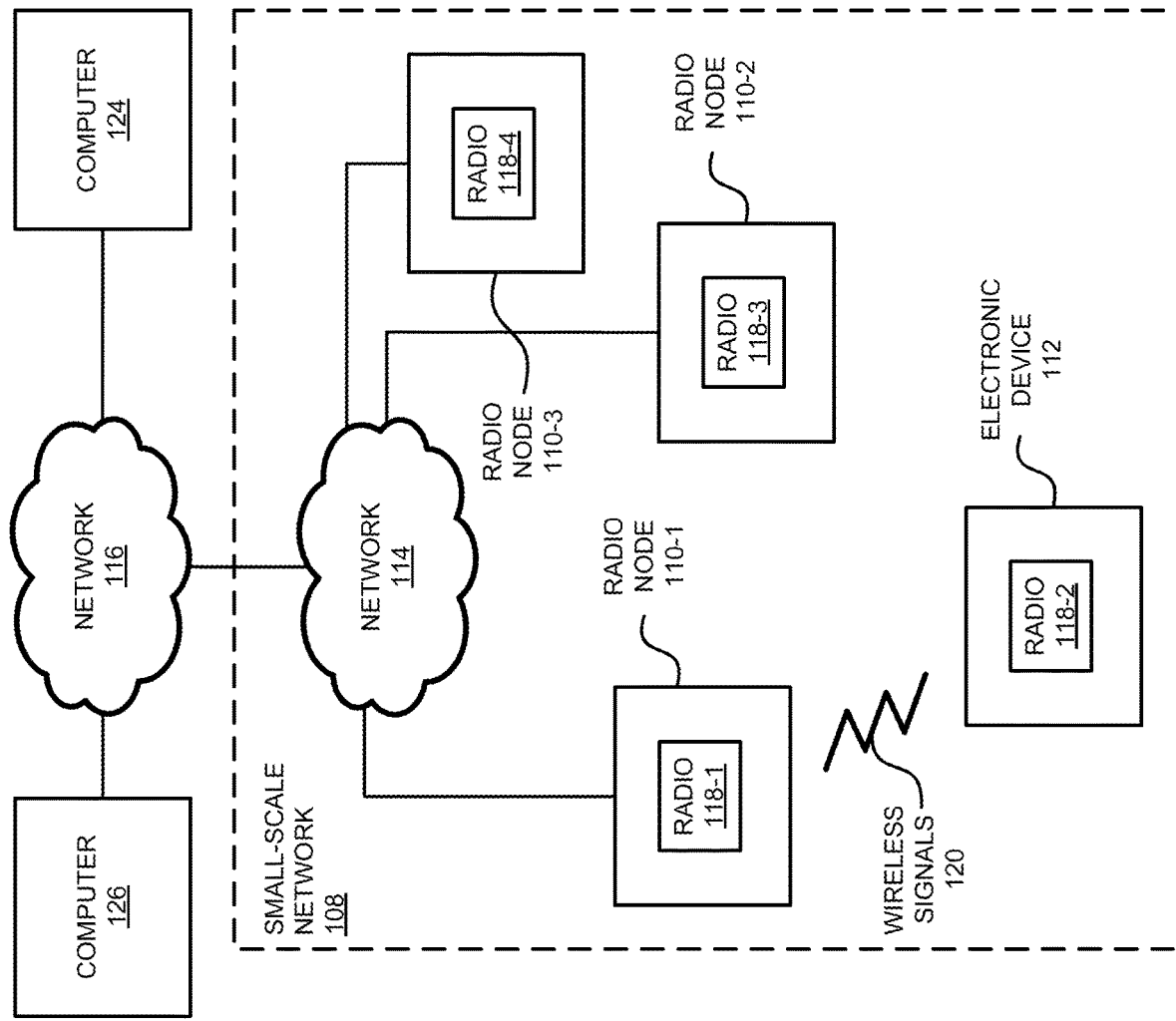
FIG. 1 is a block diagram illustrating an example of communication among a computer, radio nodes and electronic devices in a system in accordance with an embodiment of the present disclosure.

A radio node that dynamically updates a network-relationship table is described. During operation, the radio node may perform a network listen for wireless energy associated with a first subset of second radio nodes during a first time interval. Moreover, the radio node may monitor communication associated with a second subset of the second radio nodes during a second time interval and/or handovers between a third subset of the second radio nodes during a third time interval, where a given subset includes zero or more of the second radio nodes. Then, based at least in part on the first subset of the second radio nodes, the second subset of the second radio nodes and/or the third subset of the second radio nodes, the radio node may determine a change to the neighbor-relationship table, where the neighbor-relationship table includes information specifying the radio node and the second radio nodes. Next, the radio node may provide, to the second radio nodes or a computer, information specifying the change to the neighbor-relationship table.

By dynamically updating the network-relationship table, these communication techniques may help reduce or eliminate inaccuracies in the network-relationship table, which may facilitate handovers that use information included in the network-relationship table. For example, the communication techniques may facilitate handovers in a network (such as a small cell) that includes the radio node and the second radio nodes. Consequently, the communication techniques may provide improved communication performance and quality of service from the radio node and in the network.

We now describe some embodiments of the communication techniques. As discussed previously, a cellular-telephone network may include base stations (and associated cell towers) that implement macrocells. These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication techniques.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users, which is a non-limiting numerical example) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density, indoor or crowded environments. While the use of femto cells and/or small cells can mitigate this challenge, there are still often circumstances where the network performance and quality of a cellular-telephone network is degraded. As noted previously, it can be difficult to maintain a neighbor-relationship table in a small cell in a dynamic communication environment. This can degrade or disrupt service, such as during handovers. These challenges are addressed in the communication techniques described below.

In the discussion that follows, Long Term Evolution or LTE (from the 3rd Generation Partnership Project of Sophia Antipolis, Valbonne, France) is used as an illustration of a data communication protocol in a cellular-telephone network that is used during communication between one or more radio nodes and an electronic device. Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as another communication protocol). Thus, the radio nodes may include: an eNodeB, a UMTS NodeB and RNC, an NR gNB or gNodeB, etc.

Moreover, a radio node may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among electronic devices according to some embodiments. Notably, radio nodes 110 in a small-scale network 108 (such as a small cell) can communicate LTE data frames or packets using LTE with an electronic device 112 (which is sometimes referred to as 'user equipment' or UE, such as a cellular telephone and, more generally, a fixed or portable electronic device). Again, while LTE is used as an example of a cellular protocol, the embodiments herein are not so limited. Moreover, radio nodes 110 may also communicate with each other via wireless or wired communication (such as Ethernet) in network 114 and/or computer 124 (such as a controller) or computer 126 (such as a spectrum allocation server or SAS) via wireless or wired communication (such as Ethernet) in network 116. Note that networks 114 and 116 may be the same or different networks. For example, networks 114 and/or 116 may an intra-net or the Internet.

As described further below with reference to FIGS. 2-8, one or more of radio nodes 110 and/or computer 124 may perform the communication techniques by communicating via network 114. Using radio node 110-1 as an example, this radio node may perform a network listen for wireless energy associated with a first subset of the remaining radio nodes 110 during a first time interval. Moreover, radio node 110-1 may monitor communication in network 114 associated with a second subset of the remaining radio nodes 110 during a second time interval and/or handovers (or handover activity) between a third subset of the remaining radio nodes 110 during a third time interval, where a given subset includes zero or more of the remaining radio nodes 110. Then, based at least in part on the first subset of the second radio nodes, the second subset of the second radio nodes and/or the third subset of the second radio nodes, radio node 110-1 may determine a change to a neighbor-relationship table that includes information specifying radio nodes 110. Next, radio node 110-1 may provide, via network 114, information specifying the change to the neighbor-relationship table to the remaining radio nodes 110 and/or computer 124. For example, the information specifying the change to the neighbor-relationship table may be unicast or broadcast to the remaining radio nodes 110. Note that one or more of the first time interval, the second time interval and the third time interval may be different. Alternatively, the first time interval, the second time interval and the third time interval may be the same, such as, e.g., 24 hrs.

For example, the change to the neighbor-relationship table may include: adding a new radio node to the neighbor-relationship table, where the new radio node is not currently included in the neighbor-relationship table; and/or subtracting an existing radio node from the neighbor-relationship table, where the existing radio node is currently included in the neighbor-relationship table. For example, the existing radio node may be subtracted when: no wireless energy associated with the existing radio node is detected during the first time interval; no communication with the existing radio node occurs during the second time interval, and/or a handover associated with the existing radio node does not occur during the third time interval. Alternatively or additionally, the new radio node may be added when: wireless energy associated with the new radio node is detected during the first time interval; communication with the new radio node occurs during the second time interval, and/or a handover associated with the new radio node occurs during the third time interval.

In some embodiments, updating of the neighbor-relationship table is distributed in small-scale network 108 (e.g., it is performed by radio nodes 110) and/or centralized (e.g., it is performed by computer 124). For example, in addition to radio node 110-1 providing information specifying the change to the neighbor-relationship table, at least one or more of remaining radio nodes 110 (such as radio node 110-2) may provide, via network 114, information specifying a change to the neighbor-relationship table to the other radio nodes 110. Thus, in some embodiments, radio node 110-1 may receive, from radio node 110-2, information specifying the change to the neighbor-relationship table. Then, radio node may update the neighbor-relationship table based at least in part on the received change to the neighbor-relationship table. Alternatively or additionally, one or more of radio nodes 110 (such as radio node 110-1) may provide, to computer 124, the information specifying one or more changes to the neighbor-relationship table. Based at least in part on this information, computer 124 may update the neighbor-relationship table, and then may provide, to radio nodes 110, the updated neighbor-relationship table.

Radio nodes 110 may use the neighbor-relationship table during handovers. Using radio node 110-1 as an example, radio node 110-1 may provide, to electronic device 112, information specifying one or more of the second radio nodes (such as radio nodes 110-2 and 110-3) in the neighbor-relationship table, and may instruct electronic device 112 to scan for radio nodes 110-2 and 110-3. In response, electronic device 112 may perform the scan and may determine one or more communication-performance metrics associated with radio nodes 110-2 and 110-3. For example, the one or more communication-performance metrics may include: an RSRP, a received signal strength indicator (RSSI), a path-loss, etc. Then, electronic device 112 may provide, to radio node 110-1, the one or more communication-performance metrics associated with radio nodes 110-2 and 110-3. Next, based at least in part on the one or more communication-performance metrics associated with radio nodes 110-2 and 110-3, radio node 110-1 may provide, to electronic device 112, an instruction for a handover to a target second radio node, such as radio node 110-2. This instruction may indicate a band of frequencies or a channel used by radio node 110-2. In some embodiments, radio node 110-1 may provide, via network 114, information about the handover to radio node 110-2, so that radio node 110-2 can establish a new connection with electronic device 112.

Note that the aforementioned operations in the communication techniques may be performed, e.g., periodically and/or as needed (such as when a change is detected).

In some embodiments, the wireless communication in small-scale network 108 may use a shared-license-access band of frequencies. For example, the shared-license-access band of frequencies may include the CBRS near 3.5 GHz (such as the 150 MHz of bandwidth between 3.55 GHz and 3.7 GHz). Notably, a given radio node (such as radio node 110-1) may provide a grant request to computer 126 to reserve a portion of a spectrum or bandwidth (such as a portion of the spectrum in a shared-license-access band of frequencies or another band of frequencies) for its use. In some embodiments, radio node 110-1 may request a grant to reserve 5, 10, 20, 40, 80, 100 or 150 MHz of spectrum in CBRS from computer 126. In response, computer 126 may provide a grant response to radio node 110-1 with approval of a grant for the requested portion of the shared-license-access band of frequencies.

Then, radio node 110-1 may request from computer 126 authorization to transmit in the granted portion of the shared-license-access band of frequencies. For example, radio node 110-1 may provide a keep-alive message (such as a heartbeat request) to computer 126 in order to request authorization to transmit in the granted portion of the shared-license-access band of frequencies. When radio node 110-1 receives a keep-alive response from computer 126, then radio node 110-1 may be authorized to transmit in the granted portion of the shared-license-access band of frequencies until a transmit expire time has elapsed.

In these ways, the communication techniques may dynamically update and maintain the neighbor-relationship table. This capability may provide improved communication performance and quality of service in small-scale network 108.

Note that in some embodiments the communication techniques may automatically determine an E-UTRA absolute radio frequency channel number (EARFCN) population.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic device 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 9:
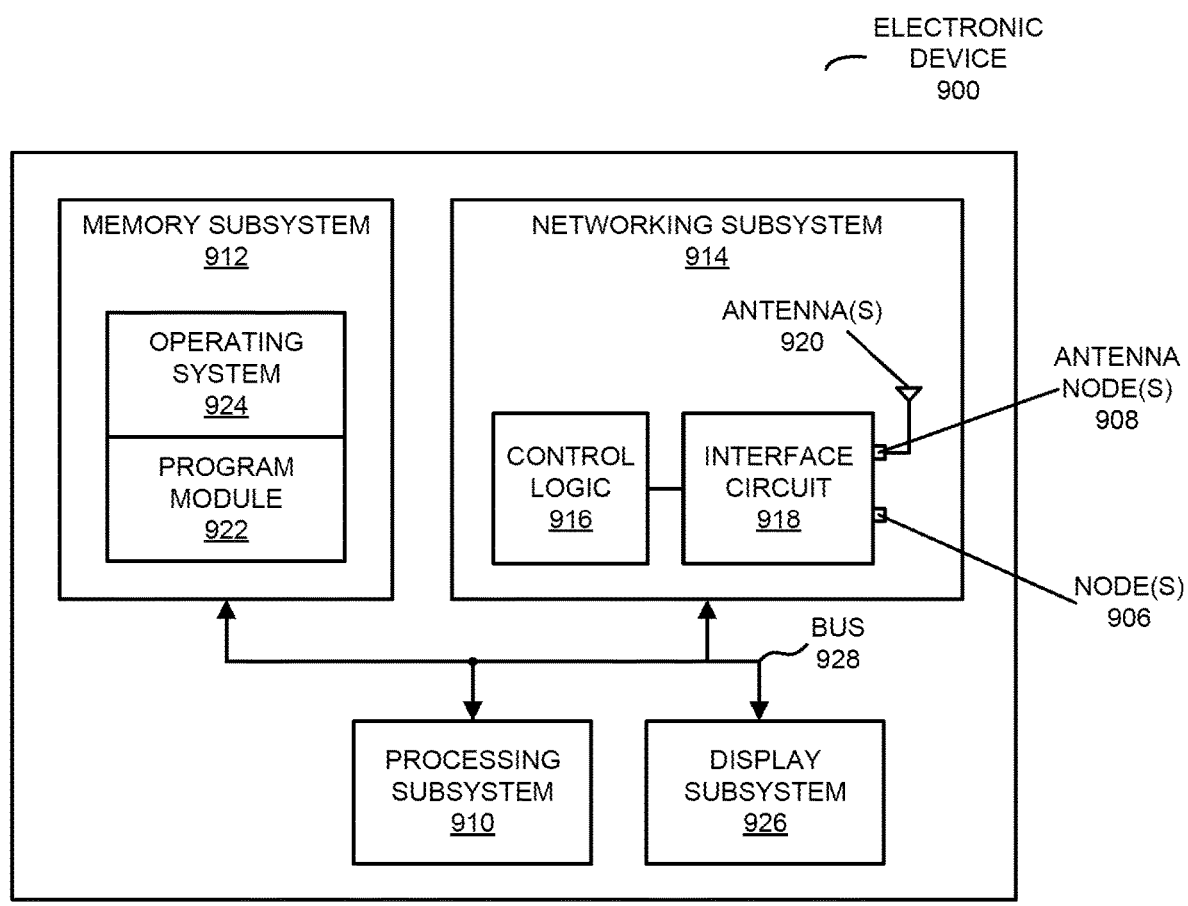
FIG. 9 is a block diagram illustrating an example of an electronic device in accordance with an embodiment of the present disclosure.

As described further below with reference to FIG. 9, radio nodes 110 and electronic device 112 may include subsystems, such as a networking subsystem, a memory subsystem and a processor subsystem. In addition, radio nodes 110 and electronic device 112 may include radios 118 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can include transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 120 (represented by a jagged line) are transmitted by radios 118 in radio nodes 110 and electronic device 112. For example, radio 118-1 in radio node 110-1 may transmit information (such as frames or packets) using wireless signals 120. These wireless signals are received by radios 118 in one or more other electronic devices (such as radio 118-2 in electronic device 112). This may allow radio node 110-1 to communicate information to other radio nodes 110 and/or electronic device 112. Note that wireless signals 120 may convey LTE frames or packets.

In the described embodiments, processing a frame that includes packets in radio nodes 110 and electronic device 112 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments include more or fewer electronic devices. As another example, in another embodiment, different electronic devices are transmitting and/or receiving frames that include packets.

Figure 2:
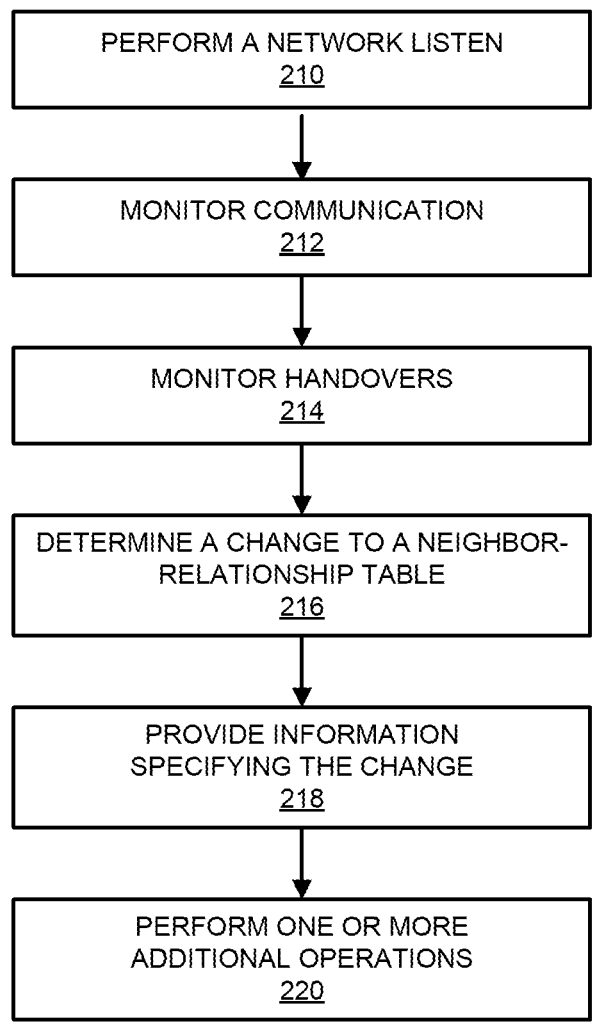
FIG. 2 is a flow diagram illustrating an example of a method for dynamically updating a network-relationship table using a radio node in FIG. 1 in accordance with an embodiment of the present disclosure.

We now describe embodiments of the methods. FIG. 2 presents a flow diagram illustrating an example of a method 200 for dynamically updating a network-relationship table, which may be performed by a radio node (such as one of radio nodes 110 in FIG. 1). During operation, a first interface circuit in the radio node, which uses a wireless communication protocol, may perform a network listen (operation 210) for wireless energy associated with a first subset of second radio nodes during a first time interval. Moreover, a second interface circuit in the radio node, which uses a wired communication protocol, may monitor communication (operation 212) associated with a second subset of the second radio nodes during a second time interval and/or handovers (operation 214) between a third subset of the radio nodes during a third time interval, where a given subset includes zero or more of the second radio nodes. Then, based at least in part on the first subset of the second radio nodes, the second subset of the second radio nodes and/or the third subset of the second radio nodes, the radio node may determine a change to a neighbor-relationship table (operation 216), where the neighbor-relationship table includes information specifying the radio node and the second radio nodes. Next, the second interface circuit provides, to the second radio nodes, information (operation 218) specifying the change to the neighbor-relationship table.

Note that the first interface circuit may be different from the second interface circuit. Moreover, one or more of the first time interval, the second time interval and the third time interval may be different. Alternatively, the first time interval, the second time interval and the third time interval may be the same, such as, e.g., 24 hrs.

Furthermore, the change to the neighbor-relationship table may include: adding a new second radio node to the neighbor-relationship table, where the new second radio node is not currently included in the neighbor-relationship table; and/or subtracting an existing second radio node from the neighbor-relationship table, where the existing second radio node is currently included in the neighbor-relationship table. For example, the existing second radio node may be subtracted when: no wireless energy associated with the existing second radio node is detected during the first time interval; no communication with the existing second radio node occurs during the second time interval, and/or a handover associated with the existing second radio node does not occur during the third time interval. Alternatively or additionally, the new second radio node may be added when: wireless energy associated with the new second radio node is detected during the first time interval; communication with the new second radio node occurs during the second time interval, and/or a handover associated with the new second radio node occurs during the third time interval.

Additionally, the wired communication protocol includes an X2 interface or an S1 interface. However, a wide variety of interfaces may be used.

Note that the wireless communication protocol may use a band of frequencies in the CBRS.

In some embodiments, the communication associated with a second subset of the second radio nodes may use established connections between the radio node and the second subset of the second radio nodes.

Moreover, the radio node may include: an eNodeB, a UMTS NodeB and RNC, an NR gNB or gNodeB.

In some embodiments, the radio node optionally performs one or more additional operations (operation 220). For example, the second interface circuit may receive, from at least one of the second radio nodes, additional information specifying an additional change to the neighbor-relationship table. Then, the radio node may update the neighbor-relationship table based at least in part on the additional change to the neighbor-relationship table.

Moreover, the first interface circuit may provide, to the electronic device, information specifying one or more of the second radio nodes in the neighbor-relationship table, and may instruct the electronic device to scan for the one or more of the second radio nodes. In response, the first interface circuit may receive, from the electronic device, one or more communication-performance metrics associated with the one or more of the second radio nodes. For example, the one or more communication-performance metrics may include: an RSRP, a pathloss, etc. Then, the first interface circuit may provide, to the electronic device, an instruction for a handover to a target second radio node in the second radio nodes based at least in part on the one or more communication-performance metrics.

In some embodiments of method 200, there may be additional or fewer operations. Furthermore, the order of the operations may be changed, and/or two or more operations may be combined into a single operation.

Figure 3:
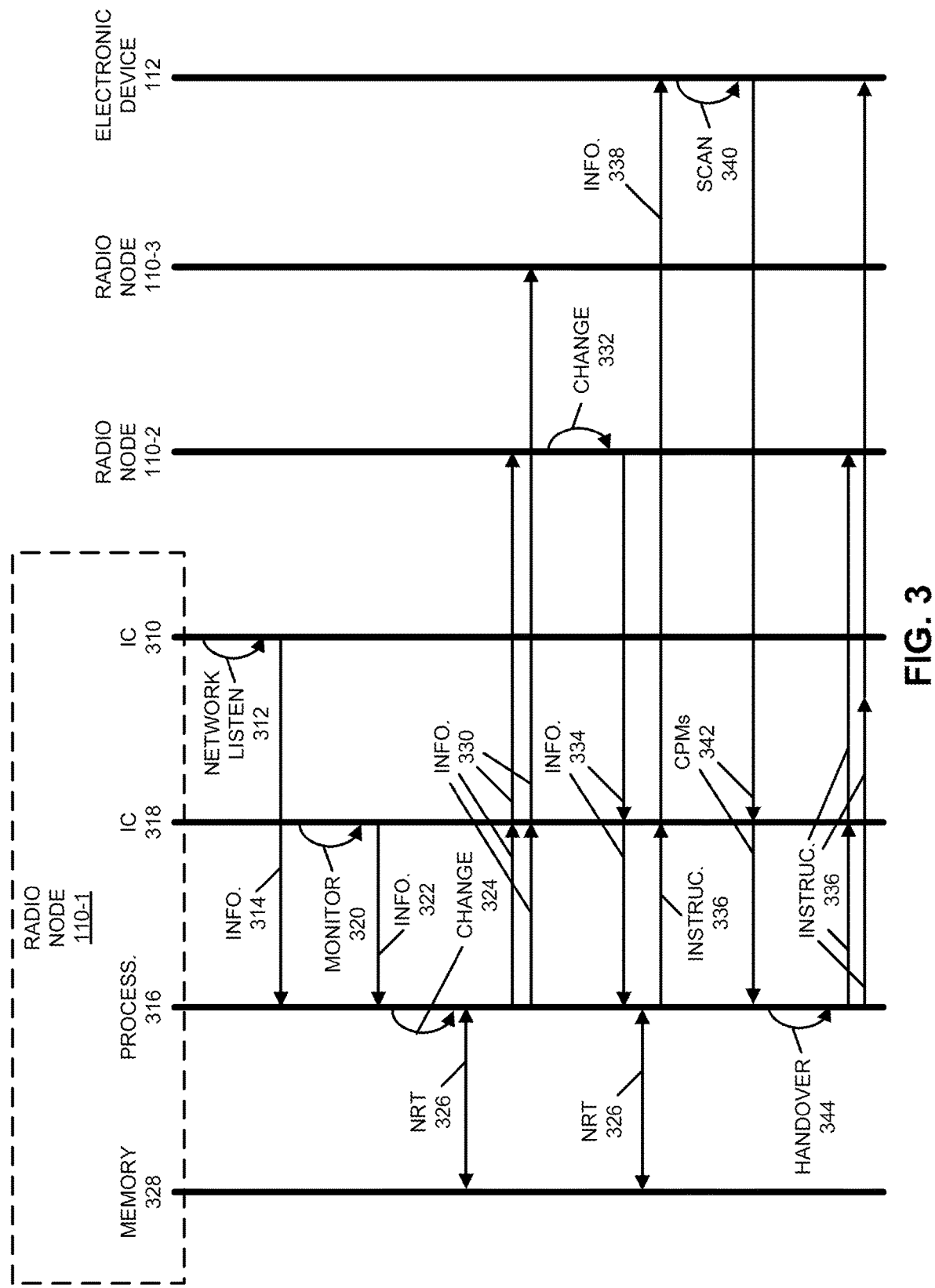
FIG. 3 is a drawing illustrating an example of communication among the electronic devices in FIG. 1 in accordance with an embodiment of the present disclosure.

Embodiments of the communication techniques are further illustrated in FIG. 3, which presents a drawing illustrating an example of communication among radio nodes 110 and electronic device 112. In FIG. 3, an interface circuit (IC) 310 in radio node 110-1 may perform a network listen 312 for wireless energy associated with a first subset of radio nodes 110-2 and 110-3 during a first time interval. Then, interface circuit 310 may provide information 314 specifying the first subset of radio nodes 110-2 and 110-3 to processor 316 in radio node 110-1.

Moreover, an interface circuit 318 in radio node 110-1 may monitor 320 communication associated with a second subset of radio nodes 110-2 and 110-3 during a second time interval and/or handovers between a third subset of radio nodes 110-2 and 110-3 during a third time interval. Then, interface circuit 318 may provide information 322 specifying the second subset of radio nodes 110-2 and 110-3 and the third subset of radio nodes 110-2 and 110-3 to processor 316.

Next, based at least in part on the first subset of radio nodes 110-2 and 110-3, the second subset of radio nodes 110-2 and 110-3 and/or the third subset of radio nodes 110-2 and 110-3, processor 316 may determine a change 324 to a neighbor-relationship table 326, where the neighbor-relationship table (NRT) 326 includes information specifying the radio nodes 110. Furthermore, processor 316 may update the neighbor-relationship table 326 stored in memory 328 in radio node 110-1 based at least in part on change 324 to the neighbor-relationship table 326.

Additionally, interface circuit 310 may provide, to radio nodes 110-2 and 110-3, information 330 specifying change 324 to the neighbor-relationship table 326.

In some embodiments, radio node 110-2 may use the communication techniques to determine a change 332 to the neighbor-relationship table 326. Then, radio node 110-2 may provide to radio nodes 110-2 and 110-3, information 334 specifying change 332 to the neighbor-relationship table 326. After receiving information 334 specifying change 332 to the neighbor-relationship table 326, interface circuit 318 may provide this information to processor 316, which accordingly modifies or updates the neighbor-relationship table 326 in memory 330.

Moreover, processor 316 may instruct 336 interface circuit 310 to provide, to electronic device 112, information 338 specifying radio nodes 110-2 and 110-3 in the neighbor-relationship table 326, and information 338 may instruct electronic device 112 to scan for radio nodes 110-2 and 110-3. For example, processor 316 may provide instruction 336 to determine whether a handover of electronic device 112 from a connection with radio node 110-1 to a connection with radio node 110-2 or 110-3 is appropriate, such as when electronic device 112 can receive wireless signals from radio node 110-2 or 110-3 with improved communication performance relative to wireless signals from radio node 110-1.

In response, electronic device 112 may perform scan 340 and may determine one or more communication-performance metrics (CPMs) 340 associated with radio nodes 110-2 and 110-3. Then, electronic device 112 may provide the one or more communication-performance metrics (CPIs) 342 associated with radio nodes 110-2 and 110-3 to radio node 110-1.

After receiving the one or more communication-performance metrics 342, interface circuit 310 may provide the one or more communication-performance metrics 342 to processor 316. In response, processor 316 may determine whether to perform a handover 344, e.g., to radio node 110-2 based at least in part on the one or more communication-performance metrics 342. If yes, processor 316 may provide an instruction 346 for handover 344 to interface circuit 310, which provides instruction 346 to electronic device 112 and/or radio node 110-2.

While FIG. 3 illustrates communication between components using unidirectional or bidirectional communication with lines having single arrows or double arrows, in general the communication in a given operation in this figure may involve unidirectional or bidirectional communication.

Figure 4:
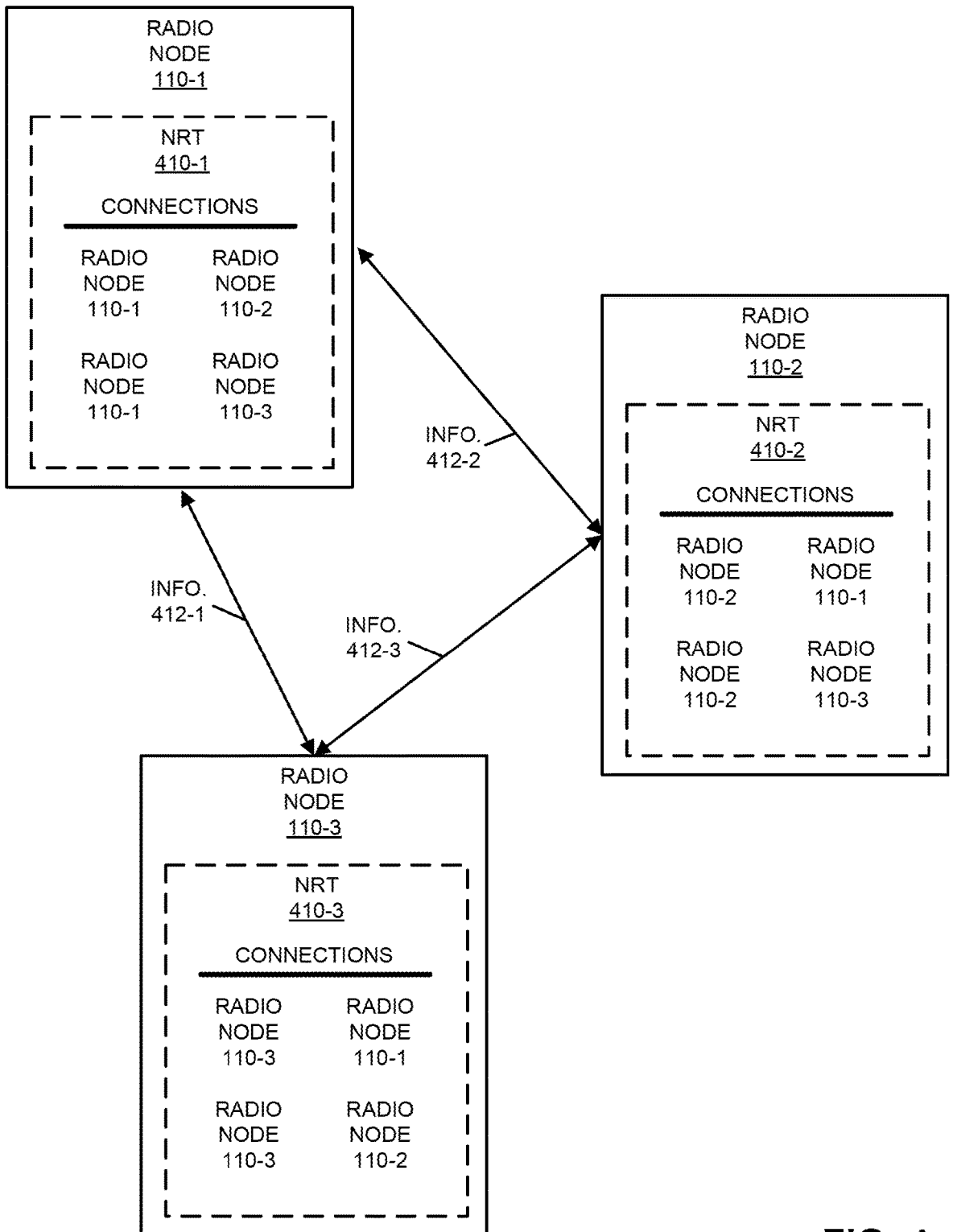
FIG. 4 is a drawing illustrating an example of a technique for dynamically updating a network-relationship table in accordance with an embodiment of the present disclosure.

In some embodiments of the communication techniques, radio nodes in a small cell collaboratively determine updates to a neighbor-relationship table. This is shown in FIG. 4, which presents a drawing illustrating an example of a technique for dynamically updating a network-relationship table 410. Notably, radio nodes 110 may perform measurements, such as network listen, communication among radio nodes 110 and/or handovers from one radio node to another. Based at least in part on these measurements, one or more of radio nodes 110 may determine one or more changes to instances of the network-relationship table 410. Then, radio nodes 110 that determined the one or more changes may provide information 412 specifying the one or more changes to the other radio nodes 110. Moreover, radio nodes 110 may update the instances of the network-relationship table 410 based at least in part on the one or more changes.

In this way, radio nodes 110 may locally monitor for information that indicates there is a new radio node and/or that an existing radio node is no longer present or operating. Then, radio nodes 110 may collaboratively exchange this information, so that radio nodes 110 can dynamically update or maintain the network-relationship table.

Figure 5:
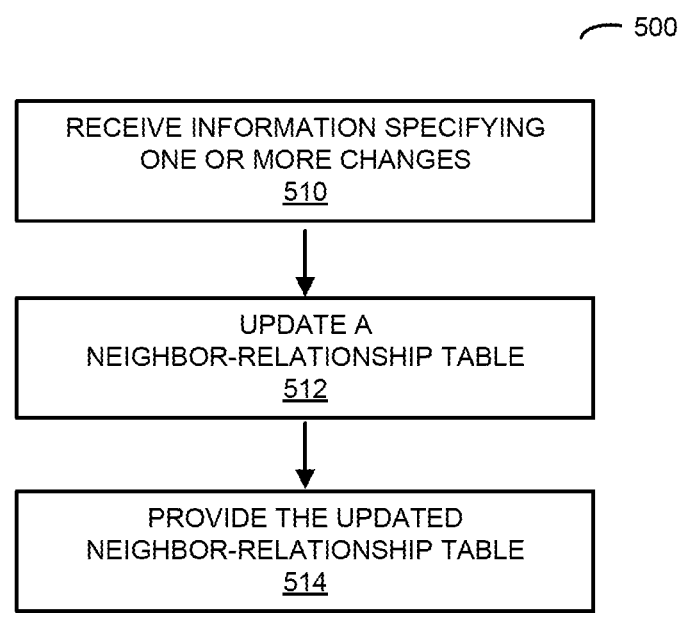
FIG. 5 is a flow diagram illustrating an example of a method for dynamically updating a network-relationship table using a computer in FIG. 1 in accordance with an embodiment of the present disclosure.

FIG. 5 presents a flow diagram illustrating an example of a method 500 for dynamically updating a network-relationship table, which may be performed by a computer (such as computer 124 in FIG. 1). During operation, the computer may receive, using a wired communication protocol, information specifying one or more changes (operation 510) to a neighbor-relationship table from one or more radio nodes, where the neighbor-relationship table includes information specifying the radio nodes.

Then, the computer may update the neighbor-relationship table (operation 512) based at least in part on the information specifying the one or more changes to the neighbor-relationship table. In some embodiments, the computer may determine the update based at least in part on a comparison of the one or more changes to the neighbor-relationship table. For example, the computer may only make changes that are agreed upon or consistent with the information specifying the one or more changes to the neighbor-relationship table from a majority or all of the radio nodes.

Next, the computer may provide, to the radio nodes, the updated neighbor-relationship table (operation 514. Note that the updated neighbor-relationship table may be provided in its entirety or differentially (e.g., the changes relative to a previous version of the neighbor-relationship table).

In some embodiments of method 500, there may be additional or fewer operations. Furthermore, the order of the operations may be changed, and/or two or more operations may be combined into a single operation.

Figure 6:
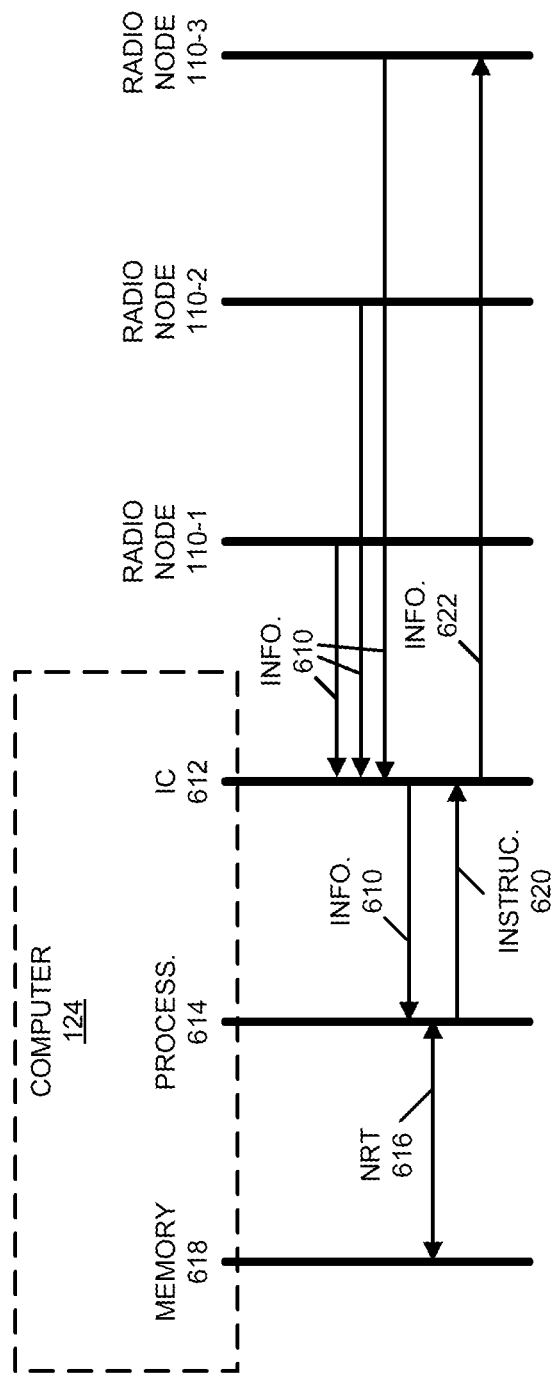
FIG. 6 is a drawing illustrating an example of communication among the electronic devices in FIG. 1 in accordance with an embodiment of the present disclosure.

Embodiments of the communication techniques are further illustrated in FIG. 6, which presents a drawing illustrating an example of communication between radio nodes 110 and computer 124. In FIG. 6, radio nodes 110 may provide information 610 specifying one or more changes to a neighbor-relationship table 616, where the neighbor-relationship table includes information specifying radio nodes 110.

After receiving information 610, an interface circuit 612 in computer 124 may provide information 610 to processor 614 in computer 124. Then, processor 614 may update the neighbor-relationship table 616 based at least in part on information 612. For example, processor 614 may update the neighbor-relationship table 616 stored in memory 618 in computer 124.

Next, processor 614 may provide an instruction 620 to interface circuit 612, which provides, to radio nodes 110, information 622 specifying the updated neighbor-relationship table 616.

While FIG. 6 illustrates communication between components using unidirectional or bidirectional communication with lines having single arrows or double arrows, in general the communication in a given operation in this figure may involve unidirectional or bidirectional communication.

Figure 7:
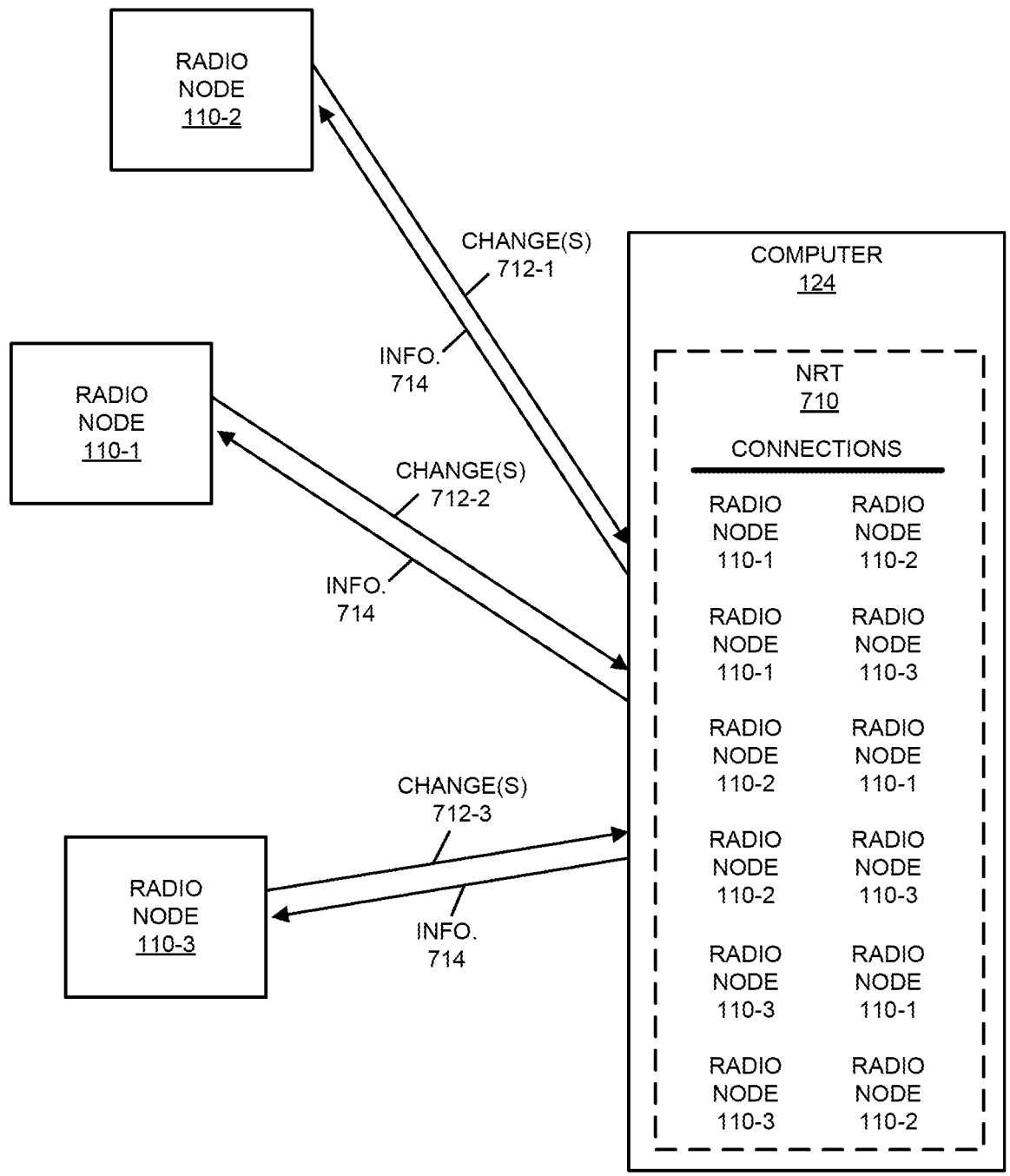
FIG. 7 is a drawing illustrating an example of a technique for dynamically updating a network-relationship table in accordance with an embodiment of the present disclosure.

In some embodiments of the communication techniques, a computer centrally maintains and distributes a network-relationship table to radio nodes. This is shown in FIG. 7, which presents a drawing illustrating an example of a technique for dynamically updating a network-relationship table 710. Notably, radio nodes 110 may perform measurements, such as network listen, communication among radio nodes 110 and/or handovers from one radio node to another. Based at least in part on these measurements, one or more of radio nodes 110 may determine one or more changes 712 to network-relationship table 710. Then, radio nodes 110 that determined the one or more changes 712 may provide information specifying the one or more changes 712 to computer 124. Moreover, computer 124 may update network-relationship table 710 based at least in part on the one or more changes 712, and may provide information 714 specifying the updated network-relationship table 710 to radio nodes 110.

In this way, radio nodes 110 may locally monitor for information that indicates there is a new radio node and/or that an existing radio node is no longer present or operating. Then, radio nodes 110 may provide this information to computer 124, so that computer 124 can dynamically update or maintain the network-relationship table and disseminate the updated network-relationship table to radio nodes 110.

Figure 8:
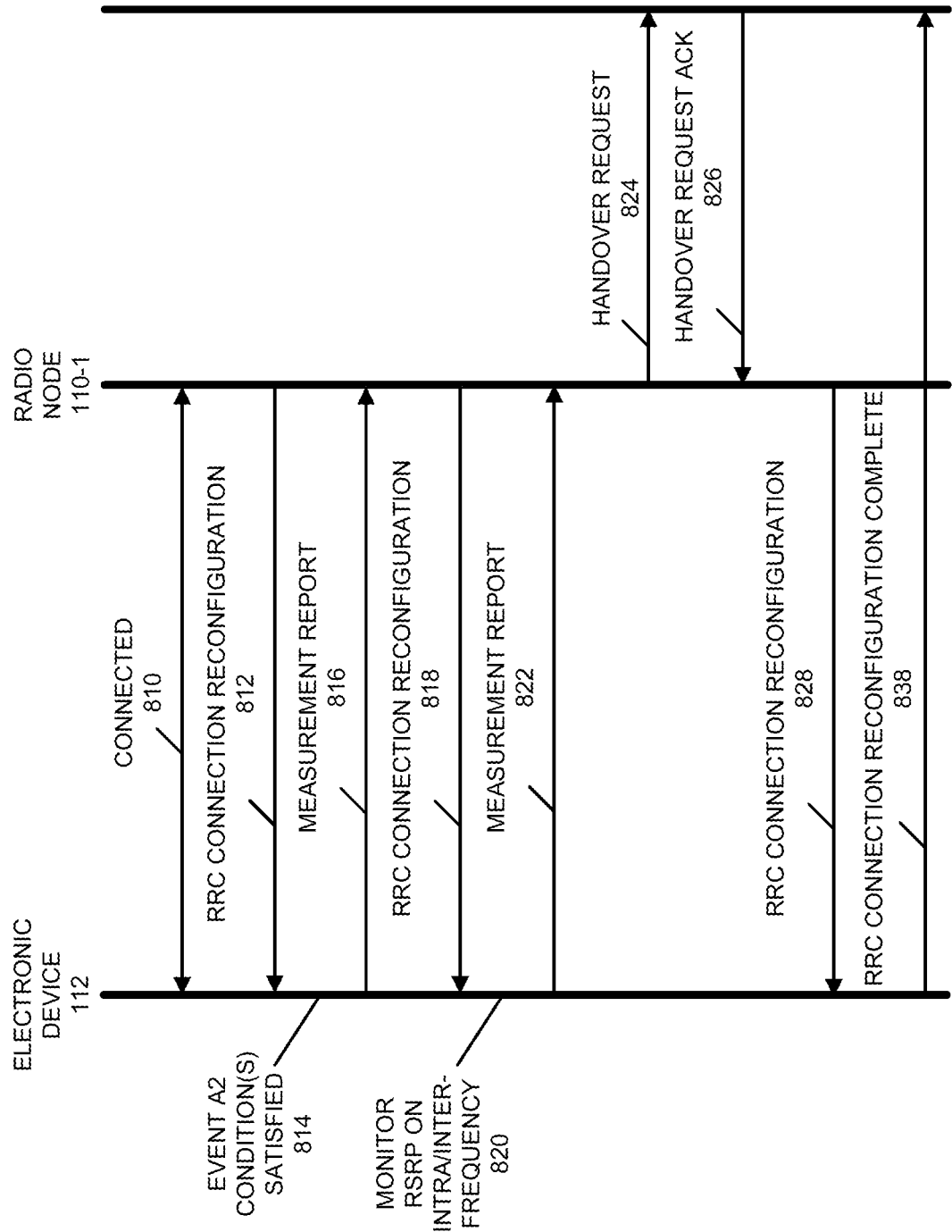
FIG. 8 is a drawing illustrating an example of communication among the electronic devices in FIG. 1 in accordance with an embodiment of the present disclosure.

We now describe a handover of an electronic device in a wireless network (such as a cellular-telephone network). FIG. 8 presents a drawing illustrating an example of communication among the electronic devices in FIG. 1 in accordance with an embodiment of the present disclosure. This communication illustrates how the predefined handover parameters may be used. Notably, electronic device 112 may communicate with a source radio node (radio node 110-1). For example, electronic device may be initially connected 810 to radio node 110-1. Then, radio node 110-1 may provide to electronic device 112 a radio resource control (RRC) connection reconfiguration message 812 with information that specifies the first threshold, the second threshold and/or the third threshold.

When the second threshold condition is satisfied 814 (such as when the serving frequency quality, e.g., the RSRP, falls below the second threshold), electronic device 112 may provide to radio node 110-1 a measurement report 816 that indicates that the second threshold condition is satisfied. In response, radio node 110-1 may provide to electronic device 112 an RRC connection reconfiguration message 818 with information that specifies a fourth threshold, a handover threshold and/or a measurement gap configuration.

Then, electronic device 112 may monitor the RSRP on the intra/inter-frequency 820. Moreover, electronic device 112 may provide to radio node 110-1 a measurement report 822 that indicates that the fourth threshold or the handover threshold is satisfied.

Next, radio node 110-1 may provide to a target radio node (such as radio node 110-2) a handover request 824 (e.g., via an X2 interface). In response, radio node 110-2 may provide to radio node 110-1 a handover request acknowledgment 826 of ACK (e.g., via the X2 interface). Furthermore, radio node 110-1 may provide to electronic device 112 an RRC connection reconfiguration message 828 with information that specifies radio node 110-2, a physical cell identifier (PCI), a frequency used by radio node 110-2, etc.). Additionally, electronic device 112 may provide to radio node 110-2 an RRC connection reconfiguration complete message 830.

We now describe embodiments of an electronic device, which may perform at least some of the operations in the communication techniques. FIG. 9 presents a block diagram illustrating an example of an electronic device 900 in accordance with some embodiments, such as one of radio nodes 110, electronic device 112, computer 124 and/or computer 126. This electronic device includes processing subsystem 910, memory subsystem 912, and networking subsystem 914. Processing subsystem 910 includes one or more devices configured to perform computational operations. For example, processing subsystem 910 can include one or more microprocessors, graphics processing units (GPUs), ASICs, microcontrollers, programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as program module 922 or operating system 924), which may be executed by processing subsystem 910. Note that the one or more computer programs or program modules may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910.

In addition, memory subsystem 912 can include mechanisms for controlling access to the memory. In some embodiments, memory subsystem 912 includes a memory hierarchy that includes one or more caches coupled to a memory in electronic device 900. In some of these embodiments, one or more of the caches is located in processing sub system 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918 and one or more antennas 920 (or antenna elements). (While FIG. 9 includes one or more antennas 920, in some embodiments electronic device 900 includes one or more nodes, such as antenna nodes 908, e.g., a pad, which can be coupled to the one or more antennas 920, or nodes 906, which can be coupled to a wired or optical connection or link. Thus, electronic device 900 may or may not include the one or more antennas 920. Note that the one or more nodes 906 and/or antenna nodes 908 may constitute input(s) to and/or output(s) from electronic device 900.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 900 may be adapted or changed using pattern shapers (such as reflectors) in one or more antennas 920 (or antenna elements), which can be independently and selectively electrically coupled to ground to steer the transmit antenna pattern in different directions. Thus, if one or more antennas 920 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 900 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices as described previously.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc.

Electronic device 900 can be (or can be included in) any electronic device with at least one network interface. For example, electronic device 900 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program module 922 is included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. The integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein includes receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and an LTE communication protocol as an illustrative example, in other embodiments a wide variety of communication protocols and, more generally, wired or wireless communication techniques may be used. For example, instead of Ethernet, a communication protocol that is compatible with the Internet Protocol is used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program module 922, operating system 924 (such as a driver for interface circuit 918) or in firmware in interface circuit 918. Thus, the communication techniques may be implemented at runtime of program module 922. Alternatively or additionally, at least some of the operations in the communication techniques may be implemented in a physical layer, such as hardware in interface circuit 918.

While examples of numerical values are provided in the preceding discussion, in other embodiments different numerical values are used. Consequently, the numerical values provided are not intended to be limiting.

Moreover, while the preceding embodiments illustrated the use of the communication techniques with CBRS (e.g., a frequency band near 3.5 GHz), in other embodiments of the communication techniques different wireless signals and/or different frequency band(s) may be used. For example, the wireless signals may be communicated in one or more bands of frequencies, including: 900 MHz, 2.4 GHz, 5 GHz, 60 GHz, and/or a band of frequencies used by LTE or another cellular-telephone communication protocol.

Furthermore, while the preceding embodiments illustrated the use of measurements performed by the radio nodes to determine changes to the neighbor-relationship table, in other embodiments a given radio registers changes with a computer (such as computer 124 in FIG. 1), such as when the given radio node joins or exists a network. Additionally, while the radio nodes in a network may share a common neighbor-relationship table, in other embodiments a subset of one or more radio nodes may have a different neighbor-relationship table from the neighbor-relationship table used by other radio nodes in the network.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A radio node, comprising:
a first node or connector configured to communicatively couple to an antenna;
a first interface circuit, communicatively coupled to the first node or connector, configured to communicate with an electronic device using a wireless communication protocol;
a second node or connector configured to communicatively couple to a network;
a second interface circuit, communicatively coupled to the second node or connector, configured to communicate with one or more second radio nodes using a wired communication protocol, wherein the radio node is configured to:
perform, using the first interface circuit, a network listen for wireless energy associated with a first subset of the second radio nodes during a first time interval;
monitor, using the second interface circuit, communication associated with a second subset of the second radio nodes during a second time interval, handovers between a third subset of the second radio nodes during a third time interval, or both, wherein a given subset includes zero or more of the second radio nodes;
determine a change to a neighbor-relationship table based at least in part on the first subset of the second radio nodes, the second subset of the second radio nodes and the third subset of the second radio nodes, wherein the neighbor-relationship table comprises information specifying the radio node and the second radio nodes; and
provide, using the second interface circuit and addressed to the second radio nodes, information specifying the change to the neighbor-relationship table.

2. The radio node of claim 1, wherein the first interface circuit is different from the second interface circuit.

3. The radio node of claim 1, wherein one or more of the first time interval, the second time interval and the third time interval are different.

4. The radio node of claim 1, wherein the change to the neighbor-relationship table comprises:
adding a new second radio node to the neighbor-relationship table, wherein the new second radio node is not currently included in the neighbor-relationship table; or
subtracting an existing second radio node from the neighbor-relationship table, wherein the existing second radio node is currently included in the neighbor-relationship table.

5. The radio node of claim 4, wherein the existing second radio node is subtracted when: no wireless energy associated with the existing second radio node is detected during the first time interval; no communication with the existing second radio node occurs during the second time interval, or a handover associated with the existing second radio node does not occur during the third time interval.

6. The radio node of claim 4, wherein the new second radio node is added when: wireless energy associated with the new second radio node is detected during the first time interval; communication with the new second radio node occurs during the second time interval, or a handover associated with the new second radio node occurs during the third time interval.

7. The radio node of claim 1, wherein the communication associated with the second subset of the second radio nodes uses established connections between the radio node and the second subset of the second radio nodes.

8. The radio node of claim 1, wherein the wired communication protocol comprises an X2 interface or an S1 interface.

9. The radio node of claim 1, wherein the wireless communication protocol uses a band of frequencies in a Citizens Broadband Radio Service (CBRS).

10. The radio node of claim 1, wherein the radio node, using the first interface circuit, is configured to:
provide, addressed to the electronic device, information specifying one or more of the second radio nodes in the neighbor-relationship table, and instructing the electronic device to scan for the one or more of the second radio nodes;
receive, associated with the electronic device, one or more communication-performance metrics associated with the one or more of the second radio nodes;
provide, addressed to the electronic device, an instruction for a handover to a target second radio node in the second radio nodes based at least in part on the one or more communication-performance metrics.

11. The radio node of claim 10, wherein the one or more communication-performance metrics comprise: a reference signal receive power (RSRP), a received signal strength indication (RSSI) or a pathloss.

12. The radio node of claim 1, wherein the radio node comprises: an Evolved Node B (eNodeB), a Universal Mobile Telecommunications System (UMTS) NodeB and radio network controller (RNC), or a New Radio (NR) gNB or gNodeB.

13. The radio node of claim 1, wherein the radio node is configured to:
receive, using the second interface circuit and associated with at least one of the second radio nodes, additional information specifying an additional change to the neighbor-relationship table; and
update the neighbor-relationship table based at least in part on the additional change to the neighbor-relationship table.

14. A non-transitory computer-readable storage medium for use in conjunction with a radio node, the computer-readable storage medium storing program instructions that, when executed by the radio node, cause the radio node to perform operations comprising:
performing a network listen for wireless energy associated with a first subset of second radio nodes during a first time interval;
monitoring communication associated with a second subset of the second radio nodes during a second time interval, handovers between a third subset of the second radio nodes during a third time interval, or both, wherein a given subset includes zero or more of the second radio nodes;
determining a change to a neighbor-relationship table based at least in part on the first subset of the second radio nodes, the second subset of the second radio nodes and the third subset of the second radio nodes, wherein the neighbor-relationship table comprises information specifying the radio node and the second radio nodes; and providing, addressed to the second radio nodes, information specifying the change to the neighbor-relationship table.

15. The non-transitory computer-readable storage medium of claim 14, wherein one or more of the first time interval, the second time interval and the third time interval are different.

16. The non-transitory computer-readable storage medium of claim 14, wherein the change to the neighbor-relationship table comprises:
   adding a new second radio node to the neighbor-relationship table, wherein the new second radio node is not currently included in the neighbor-relationship table; or
   subtracting an existing second radio node from the neighbor-relationship table, wherein the existing second radio node is currently included in the neighbor-relationship table.

17. The non-transitory computer-readable storage medium of claim 16, wherein the existing second radio node is subtracted when: no wireless energy associated with the existing second radio node is detected during the first time interval; no communication with the existing second radio node occurs during the second time interval, or a handover associated with the existing second radio node does not occur during the third time interval; and
   wherein the new second radio node is added when: wireless energy associated with the new second radio node is detected during the first time interval; communication with the new second radio node occurs during the second time interval, or a handover associated with the new second radio node occurs during the third time interval.

18. The non-transitory computer-readable storage medium of claim 14, wherein the operations comprise:
   Receiving, associated with at least one of the second radio nodes, additional information specifying an additional change to the neighbor-relationship table; and
   updating the neighbor-relationship table based at least in part on the additional change to the neighbor-relationship table.

19. A method for dynamically updating a neighbor-relationship table, comprising:
   by a radio node:
   performing a network listen for wireless energy associated with a first subset of second radio nodes during a first time interval;
   monitoring communication associated with a second subset of the second radio nodes during a second time interval, handovers between a third subset of the second radio nodes during a third time interval, or both, wherein a given subset includes zero or more of the second radio nodes;
   determining a change to the neighbor-relationship table based at least in part on the first subset of the second radio nodes, the second subset of the second radio nodes and the third subset of the second radio nodes, wherein the neighbor-relationship table comprises information specifying the radio node and the second radio nodes; and
   providing, addressed to the second radio nodes, information specifying the change to the neighbor-relationship table.

20. The method of claim 19, wherein the change to the neighbor-relationship table comprises:
   adding a new second radio node to the neighbor-relationship table, wherein the new second radio node is not currently included in the neighbor-relationship table; or
   subtracting an existing second radio node from the neighbor-relationship table, wherein the existing second radio node is currently included in the neighbor-relationship table.

21. A radio node, comprising:
   a first node or connector configured to communicatively couple to an antenna;
   a first interface circuit, communicatively coupled to the first node or connector, configured to communicate with an electronic device using a wireless communication protocol;
   a second node or connector configured to communicatively couple to a network;
   a second interface circuit, communicatively coupled to the second node or connector, configured to communicate with a computer using a wired communication protocol, wherein the radio node is configured to:
   perform, using the first interface circuit, a network listen for wireless energy associated with a first subset of second radio nodes during a first time interval;
   monitor, using the second interface circuit, communication associated with a second subset of the second radio nodes during a second time interval, handovers between a third subset of the second radio nodes during a third time interval, or both, wherein a given subset includes zero or more of the second radio nodes;
   determine a change to a neighbor-relationship table based at least in part on the first subset of the second radio nodes, the second subset of the second radio nodes and the third subset of the second radio nodes, wherein the neighbor-relationship table comprises information specifying the radio node and the second radio nodes; and
   provide, using the second interface circuit and addressed to the computer, information specifying the change to the neighbor-relationship table.

\* \* \* \* \*